United States Patent
Akiyama et al.

(10) Patent No.: US 6,606,289 B2
(45) Date of Patent: *Aug. 12, 2003

(54) OPTICAL RECORDING MEDIUM, METHOD FOR RECORDING/REPRODUCING THE OPTICAL RECORDING MEDIUM AND APPARATUS FOR RECORDING/ REPRODUCING THE OPTICAL RECORDING MEDIUM INCLUDING A WOBBLED GROOVE

(75) Inventors: Yoshiyuki Akiyama, Kanagawa (JP); Shinichiro Iimura, Kanagawa (JP); Hiroshi Ogawa, Kanagawa (JP); Kazuo Kuroda, Saitama (JP); Toshio Suzuki, Saitama (JP); Akiyoshi Inoue, Saitama (JP); Shouji Taniguchi, Saitama (JP); Minemasa Ota, Yamanashi (JP)

(73) Assignees: Sony Corporation, Tokyo (JP); Pioneer Electronic Corporation, Saitama-Ken (JP); Pioneer Video Corporation, Yamanashi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/238,761

(22) Filed: Sep. 10, 2002

(65) Prior Publication Data

US 2003/0007434 A1 Jan. 9, 2003

Related U.S. Application Data

(62) Division of application No. 09/895,255, filed on Jul. 2, 2001, now Pat. No. 6,469,961, which is a division of application No. 09/533,700, filed on Mar. 23, 2000, now Pat. No. 6,282,166, which is a continuation of application No. 08/825,890, filed on Apr. 2, 1997, now Pat. No. 6,075,761.

(30) Foreign Application Priority Data

Apr. 2, 1996 (JP) .............................................. 8-080378
Jul. 1, 1996 (JP) .............................................. 8-171528

(51) Int. Cl.$^7$ ................................................ G11B 7/00
(52) U.S. Cl. ............................... 369/47.48; 369/53.34; 369/59.27
(58) Field of Search ......................... 369/44.13, 44.26, 369/275.1–275.5, 47.17–47.18, 47.21–47.22, 47.35, 47.54, 53.29, 53.33, 53.34, 59.22, 47.47–47.48, 59.25, 59.27

(56) References Cited

U.S. PATENT DOCUMENTS

| | | | |
|---|---|---|---|
| 4,223,347 A | 9/1980 | Bouwhuis et al. | |
| 5,031,166 A | 7/1991 | Getreuer et al. | ......... 369/44.26 |

(List continued on next page.)

FOREIGN PATENT DOCUMENTS

| | | | |
|---|---|---|---|
| EP | 0265984 A1 | 5/1988 |
| EP | 0326206 A1 | 8/1989 |
| EP | 0347858 A1 | 12/1989 |
| EP | 0595349 A1 | 5/1994 |

Primary Examiner—W. R. Young
(74) Attorney, Agent, or Firm—Frommer Lawrence & Haug LLP; William S. Frommer; Gordon Kessler (57) ABSTRACT

An optical recording medium for accurately deriving the address information or the disc rotation control information despite narrow track pitch and for recording signals to a high density, and a method and apparatus for recording and/or reproducing such optical recording medium. The optical recording medium has a wobbled groove and pits formed at a pre-set interval in an area between turns of the wobbled groove. The recording/reproducing method includes controlling rotation of the optical recording medium by a wobbled signal from the groove and detecting the position on the optical recording medium of a recording signal by pit signals detected from the pits. The recording/reproducing apparatus includes a detection device for detecting the wobbled signal from the groove and a detection device for detecting pit signals from the pits. The rotation of the optical recording medium is controlled by the wobbled signals detected from the groove and the position on the optical recording medium of the recording signal is detected by the pit signal detected from the pits.

5 Claims, 10 Drawing Sheets

U.S. PATENT DOCUMENTS

| | | |
|---|---|---|
| 5,185,732 A | 2/1993 | Ogawa et al. |
| 5,268,887 A | 12/1993 | Honguh et al. .......... 369/44.13 |
| 5,270,998 A | 12/1993 | Uchiumi ..................... 369/277 |
| 5,339,301 A | 8/1994 | Raaymakers et al. |
| 5,418,764 A | 5/1995 | Roth et al. |
| 5,537,373 A | 7/1996 | Horikiri ................... 369/44.13 |
| 5,539,724 A | 7/1996 | Ohtomo ................... 369/275.4 |
| 5,646,919 A | 7/1997 | Eastman et al. |
| 6,075,761 A | 6/2000 | Akiyama et al. |
| 6,172,956 B1 | 1/2001 | Fuji |

OPTICAL RECORDING MEDIUM, METHOD FOR RECORDING/REPRODUCING THE OPTICAL RECORDING MEDIUM AND APPARATUS FOR RECORDING/ REPRODUCING THE OPTICAL RECORDING MEDIUM INCLUDING A WOBBLED GROOVE

CROSS REFERENCE TO RELATED APPLICATIONS

This is a divisional of copending U.S. patent application Ser. No. 09/895,255, filed Jul. 2, 2001, now U.S. Pat. No. 6,469,961, which is a divisional of application Ser. No. 09/533,700, filed Mar. 23, 2000, now U.S. Pat. No. 6,282,166, which is a continuation of application Ser. No. 08/825,890, filed Apr. 2, 1997, now U.S. Pat. No. 6,075,761.

BACKGROUND OF THE INVENTION

1. Field of the Invention

This invention relates to an optical recording medium having a wobbled groove, more particularly, to a novel optical recording medium capable of recording signals to a high density. The invention also relates to a method and apparatus for recording and/or reproducing such optical recording medium.

2. Description of the Related Art

The CD-R disc, used in, for example, a so-called compact disc recordable system (CD-R), has a wobbled groove. The sector information, inclusive of the address information, is recorded by modulating the wobbled signal.

Specifically, in a CD-R recording and/or reproducing apparatus, the wobbled signal having 22 kHz as carrier wave, is detected by a recording and/or reproducing light spot converged on the groove. A data string including the address information is detected by FM demodulating the wobbled signal.

In a system in which the address is arrayed at the leading end of the sector, the address information and the recording information are recorded time-divisionally, so that the recorded signals become discontinuous signals. With the present system, the data can be recorded continuously Such feature is meritorious for an application in which emphasis is placed on interchangeability with the read-only disc on which the signals are recorded continuously.

In a method of recording the address information by modulating the wobbled signal, if the track pitch, which is the distance between neighboring groves, is reduced, the leakage of the wobbled signal from the neighboring groove is increased, thus lowering the S/N ratio of the wobbled signal. The address information not only cannot be demodulated correctly, but also the carrier wave of the wobbled signal, required for rotational control of the disc, becomes difficult to detect thus giving rise to obstructions in rotational control of the disc.

Since it s necessary to reduce the track pitch for recording the signal to a high density, it becomes necessary to reproduce the address information correctly despite the narrow track pitch.

Also, in the above system, the recording and/or reproducing spot on the disc derived from the reproduced address information depends as to its position accuracy on the frequency of the carrier wave and is substantially on the order of the wavelength of the carrier wave. On the other hand, the frequency of the carrier wave, that is the wobbling frequency, needs to be selected to a lower value in order to avoid adverse effects on the recording signal. In the case of the CD-R, the wobbling frequency is 22 kHz, with the wavelength on the disc being 54 µm.

If data is recorded discontinuously, that is with interruptions, and data is recorded subsequently in the non-recorded portion, it is necessary to record data in correct positions on the disc. If correct recording is not possible, a so-called gap needs to be provided for absorbing errors in recording positions from one recording data unit to another for avoiding overlapping between recording data.

Since the gap reduces the recording capacity on the disc, the gap length needs be reduced to as small a value as possible. However, the above-mentioned accuracy is not sufficient.

SUMMARY OF THE INVENTION

It is therefore an object of the present invention to provide an optical recording medium in which the address information and the disc rotation control information can be correctly obtained despite the narrow track pitch to enable the signal to be recorded to high density.

It is another object of the present invention to provide a method and apparatus for recording/reproducing the optical disc In one aspect, the present invention provides an optical recording medium having a wobbled groove and pits formed at a pre-set interval in an area between turns of the wobbled groove.

In another aspect, the present invention provides a method for recording and/or reproducing signals to an optical recording medium having a wobbled groove and pits formed at a pre-set interval in an area between turns of the wobbled groove. The recording method includes controlling rotation of the optical recording medium by a wobbled signal from the groove and detecting the position on the optical recording medium of a recording signal by pit signals detected from the pits.

In another aspect, the present invention provides a recording and/or reproducing apparatus including an optical recording medium having a wobbled groove and pits formed at a pre-set interval in an area between turns of the wobbled groove, detection means for detecting a wobbled signal from said groove and detection means for detecting pit signals from the pits, wherein rotation of the optical recording medium is controlled by the wobbled signals detected from the groove and wherein the position on the optical recording medium of the recording signal is detected by the pit signal detected from the pits.

With the above configuration of the present invention, the address information and the rotation control information for the optical recording medium can be obtained accurately despite narrow track pitch thus contributing to high density recording The response speed and reliability of rotational control of the optical recording medium may also be improved simultaneously. For example, if rotation of the CLV disc is controlled by only land pre-pits, these pre-pits cannot temporarily cannot be detected if the linear velocity is changed significantly due to random accessing, such that considerable time is consumed until the pre-pits are again detected to resume the rotational control. This inconvenience is resolved by using the wobbled pits and the pit signals simultaneously.

In addition, it is possible with the present invention to derive the address information more accurately and with high time precision than is possible with the conventional technique.

Moreover, if, with the optical recording medium of the present invention, the wobbled signal and the address signals are read by the sole beam spot, it becomes possible to detect the playback signal corresponding to the recording signal, servo signals (focusing servo and tracking servo signal), wobbled signal and the address information in their entirety, thus simplifying the recording/reproducing apparatus and enabling the recording/reproducing apparatus to be manufactured at reduced cost.

DESCRIPTION OF THE INVENTION

An optical recording medium according to the present invention has a wobbled pre-groove and pits are formed at pre-set intervals in an area defined between these grooves. The wobbled signal for the groove and the pt signal for the pits are used in combination for enabling high-density recording.

The pits are formed in an area defined between neighboring grooves, that is in a land. The pits may be in the form of usual pits or may be formed continuously between neighboring grooves as cut-outs in the lands interconnecting the neighboring lands.

These pits include the sector information inclusive of the sync pits or address pits, and the address information is obtained by the sector information. However, in the present invention, such sector information is not always necessary such that it may be only necessary to provide only sync pits or address pits. The sync pits indicate the start position for the sector information and are formed as two pits arranged in proximity to each other or as pits having pit lengths different from those of the other pits and hence can be detected as being distinct from the remaining pits On the other hand, a groove may have the wobbled signal of a sole frequency or may have the sector information in which the address data has been recorded by modulation The section information is the information associated with the sector of the recording date or a cluster which is a set of recording data sectors, and includes the synchronization signal and/or the address data.

The above groove or pit may be used in optional combination, such that, for example, the combination of the groove having the wobbled signal of a sole frequency and sync pit or address pit, the combination of the groove having the wobbled signal which is modulated for recording the sector information, such as synchronization signal or address data, and the sync pit or address pit, or the combination of the groove having the wobbled signal which is modulated for recording the sector information and pits of a pre-set interval, may be employed.

If, in these combinations, the combination of the groove having the wobbled signal of a sole frequency and sync pit or address pit is employed, the synchronization information and the address information can be reliably produced by these sync pits and address pits, while the disc rotation control information can be positively produced by the wobbled signal.

If the wobbled signal is the signal of a sole frequency, any leakage signal from a neighboring groove is precisely of the same frequency as the frequency of the signal for detection, so that the effect of leakage takes the from of slow changes in amplitude in the wobbled signal for detection, and hence the sole frequency for detection cannot be detected easily.

If the combination of the groove having the wobbled signal which is modulated for recording the sector information, such as synchronization signal or address data, and the sync pit or address pit, is used, the synchronization information or the address information is recorded in duplicate in the groove and the pit, thus assuring increased accuracy is reliability.

If, when the groove and the pit are used in combination, the pit position is formed at random relative to the groove, there is a fear that the resulting playback signal is fluctuated in signal level depending on the pit position to render it difficult to detect the pit correctly. There is also a fear that the circuit for generating clocks in the reproducing apparatus becomes complex in structure.

For overcoming this drawback, it is desirable that the relation between the wobbled frequency fw (mean frequency) and the pit frequency fp be an integer number relation as defined by the following equation:

$$Mfw = Nfp$$

where M and N are integers.

Stated differently, the wobbling period Tw and the pit period Tp are related to each other by an integer number relationship to each other:

$$MTw = NTp$$

where M and N are integers.

Meanwhile, the wobble period Tw is an average wobbling period and the pit period Tp is an interval which, if the pits are formed at an interval equal to a pre-set integer number multiple of the pre-set interval, is equal to such preset integer number multiple interval. On the other hand, in case two consecutive pits are sync pits, these two pits are deemed as a sole pit and the period between these two pits is disregarded in setting the pit period Tp.

If the wobbling frequency fw and the pit frequency fp are related each other by an integer number relationship as described above, it becomes possible to unify reference clocks into one or use a sole voltage controlled oscillator, thus simplifying the clock generating circuit of the recording and/or reproducing apparatus.

In addition, it becomes possible to generate a signal synchronized with the pit period from the wobbled signal by exploiting the PLL, thereby enabling the pits to be detected correctly.

Alternatively, the wobbling phase and the pit phase may be matched to each other for enabling correct pit detection. That is, by associating the pit position with a pre-set phase of wobbling and by forming pits at a constant wobbling amount (meandering amount of the groove), the pit detection signal may be stabilized for enabling the pits to be detected correctly.

Figure 1:
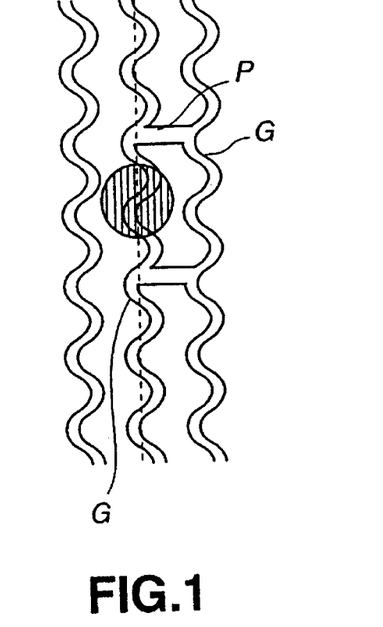
FIG. 1 is a schematic view showing an example in which a pit is formed at the center of wobbling.
Figure 2:
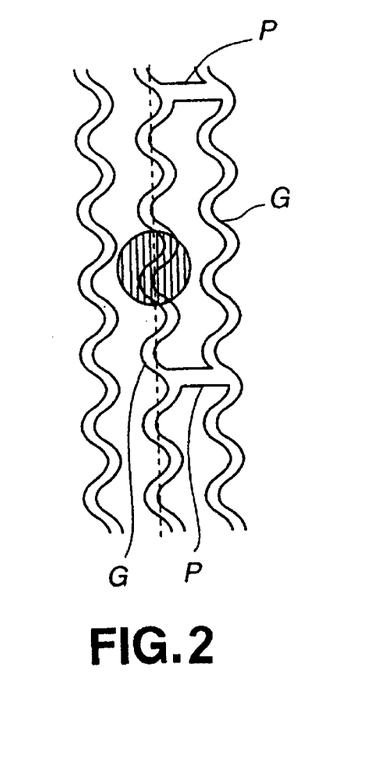
FIG. 2 is a schematic view showing an example in which the wobbling amount is maximum and a pit has been formed at a position proximate to a neighboring groove.

In this case, a pit P may be formed at a wobbling center position of a groove G (a position corresponding to the smallest wobbling amount), as shown in FIG. 1. Alternatively, the pit P may be formed at a position proximate to the neighboring groove and corresponding to the maximum wobbling amount, as shown in FIG. 2. In the former case, cross-talk from other grooves becomes minimum, whereas, in the latter case, the pit can be detected only by the signal level without removing wobbling signal component.

If the sector information inclusive of the synchronization information or the address information is recorded in the wobbled signal, and the pits include the sector information, such as the sync pits or address pits, it is desirable that the synchronization information of the wobbling signals and the sector information, especially the sync pits, be at a pre-set positional relation to each other. For example, the synchronization signal by wobbling is recorded within one pit period ahead of the sync pit in the reproducing direction.

By previously comprehending the position of the synchronization portion of the pit address from the wobbled signal, the pit address synchronization can be detected more correctly, as a result of which the pit address can be read out more reliably.

For recording/reproducing the above-described optical recording medium, disc rotation is controlled using a signal detected from a wobbled groove, and the position of the recorded signal is controlled by the information detected from the pits formed in the land.

The recording/reproducing apparatus can be simplified in structure by reading out the wobbled signal and the pit signal simultaneously by the same beam spot using the push-pull method.

DESCRIPTION OF THE PREFERRED EMBODIMENTS

Referring to the drawings, preferred embodiments of the present invention will be explained in detail.

First Embodiment

An optical disc of the present embodiment is a write-once type disc, 12 cm in diameter, having a recording film of an organic dye on which recording can be done using a laser beam having a wavelength of 635 nm.

The disc is formed of polycarbonate and is produced by injection molding with a guide groove and a land between neighboring turns of the guide groove.

The groove is approximately 0.25 $\mu$m in width and approximately 70 nm in depth and is formed as a continuous spiral groove from the inner rim to the outer rim, with the groove interval or track pitch of approximately 0.74 $\mu$m.

The wobbled signal of a sole frequency is recorded as the information for controlling the rpm of the disc and the clock frequency of the recording signal. The wobbling means slight meandering of the groove in the radial direction of the disc.

In the present embodiment, the meandering width is 20 nm and the meandering period is approximately 30 $\mu$m. Therefore if the disc is rotated at a linear velocity of 3.5 m/sec for reproducing the wobbled signal, the frequency is approximately 120 kHz.

In a land between neighboring turns of the groove, there is formed, as a pit for recording the address information (address pit), a groove approximately 0.3 $\mu$m in width and approximately 70 nm in depth, as is the guide groove.

Figure 3:
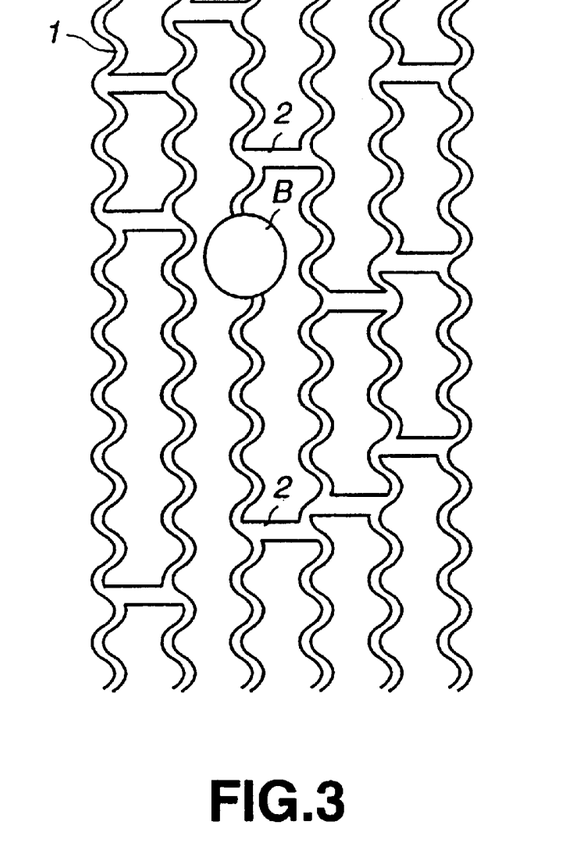
FIG. 3 is a schematic plan view showing essential portions of an example of a groove and a pit in an optical recording medium embodying the present invention.

Referring to FIG. 3, schematically showing the guide groove and the address pit, address pits 2 are formed at a pre-set interval in an area between neighboring turns of the wobbled guide groove 1. The address pits 2 are formed continuously between neighboring turns of the groove and are formed as grooves extending along the radius of the disc.

The address pits are formed at an interval of approximately 0.2 mm in association with 1/0 of the information. That is, there is an address pit at a position corresponding to the information 1, while there is no address pit at a position corresponding to the information 0. Therefore, the presence or absence of the address pit corresponds to the 1/0 of the information.

Figure 4:
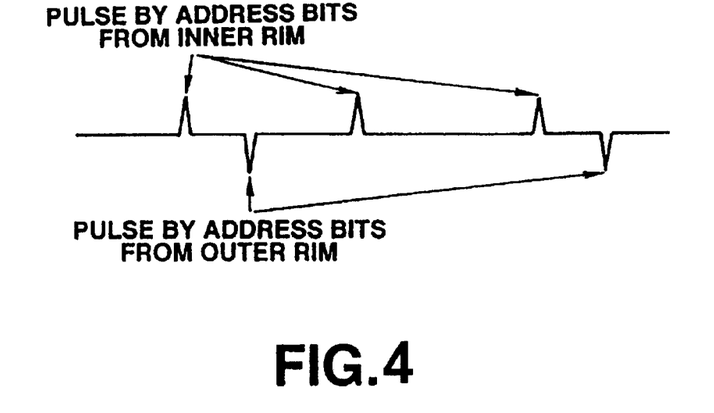
FIG. 4 is a waveform diagram showing a pulse signal obtained from a pit.

FIG. 4 shows a signal obtained an scanning a beam spot B along the groove. Specifically, there are obtained pulses of one polarity by the inner rim side address pits and those by the outer rim side address pits of the opposite polarity. It suffices if the address information is detected based on one of these two sorts of pulses.

In the present recording system, it may be presumed that, if æ0sÆ of the information occur in success ion, the state of absence of the address pits occurs in succession to render it difficult to detect address pits. In the present embodiment, the recording information is previously bi-phase modulated so that the number of contiguous æ0sÆ will be two at the maximum.

However, since the out-of-rule pattern of 000111 is provided in the synchronization signal for facilitating detection of the synchronization signal, thee is a portion in the synchronization signal domain in which address pits are not recorded for three contiguous channel bits.

Figure 5:
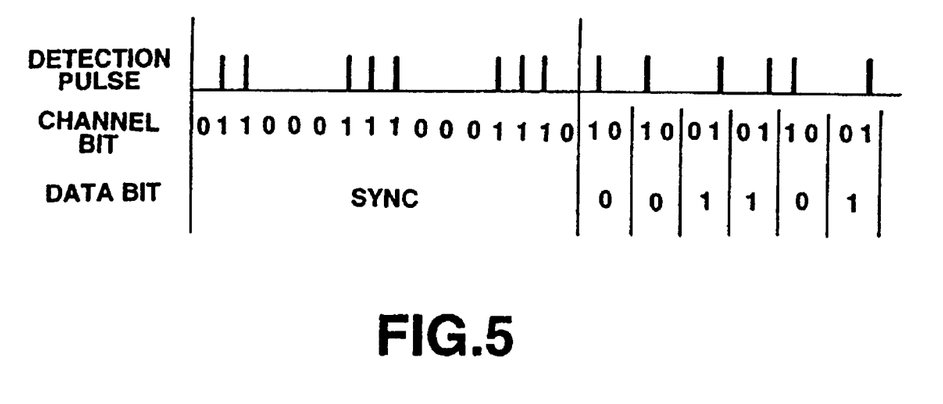
FIG. 5 shows a typical modulation of a synchronization pattern and a data pit.

FIG. 5 shows an example of modulation of data bits and the synchronization pattern. The synchronization pattern is 0110001110001110 thus containing three contiguous channel bits of 0 and 1 which are not provided in the modulation rule.

The data bits are modulated so that 0 and 1 correspond to 1–0 and 0–1, respectively, so that æ1sÆ or æ0sÆ contiguous for 3 or more channel bits are not contained in the data portion.

Figure 6:
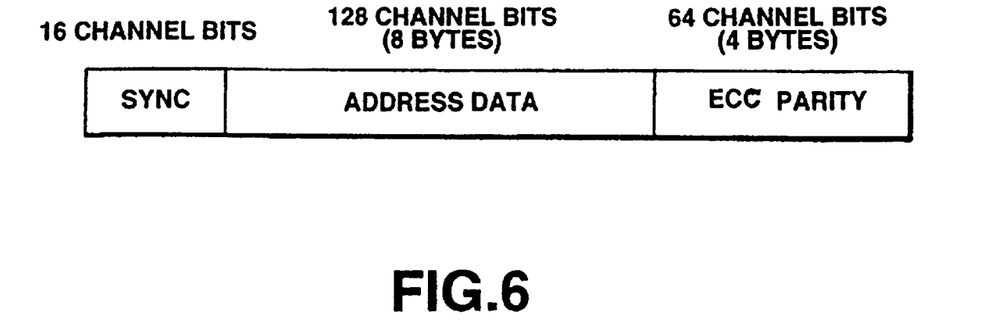
FIG. 6 shows an example of a recording format for the address information.

FIG. 6 shows an example of the recording format for the sector information. The sector information is made up of a sum total of 208 channel bits, of which the leading 16 channel bits represent the synchronization pattern. The address data of 8 bytes is followed by 4 bytes of parity for error correction by the Reed-Solomon code In the present recording format, since up to 2 bytes can be corrected by the four bytes of parity, the address data can be correctly detected if optional two channel bits of the 208 channel bits of the sector information are in error.

Next, signal reproduction of the above-described optical disc is explained. Specifically, the method of simultaneously reading out the wobbled signal of the groove and the address signal of the pits by one beam spot is explained.

Figure 7:
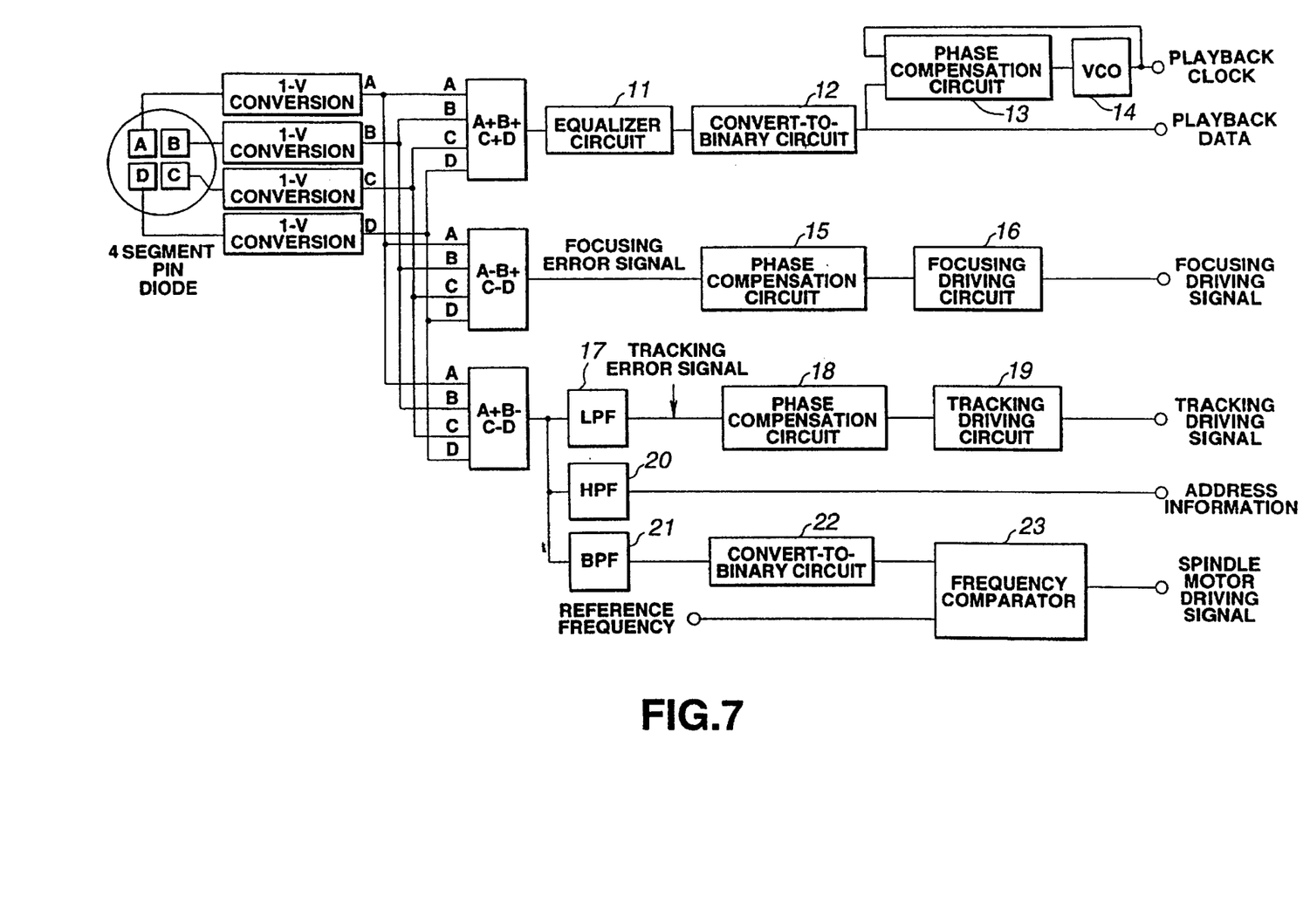
FIG. 7 is a circuit diagram showing an example of a signal reproducing circuit.

Referring to FIG. 7, which is a block diagram of a signal reproducing circuit, the return light from a beam spot B converged on the groove 1 is photo-electrically converted by four-segment PIN diode detectors A, B, C and D and I–V converted to produce signals A, B, C and D corresponding to the respective diodes.

Of these signals, the sum of the signals (A+B+B+C) represents the playback signal of the recorded signal. The sum signal is compensated for frequency response for recording/reproduction by an equalizer circuit 11 and converted to binary signals by a convert-to-binary circuit 12 to produce playback signals, from which clocks for the playback data are produced by a PLL circuit made up of a phase comparator 13 and a voltage controlled oscillator (VCO) 14.

If the calculation of A−B+C−D is performed on the signals A, B, C and D, focusing error signals of the astigmatic system are obtained.

The focusing error signal is sent via phase compensation circuit 15 to a focusing driving circuit 16 from which a focusing driving signal controlling the focusing position of an objective lens is outputted.

If the calculation of A+B−C−D is performed on the signals A, B, C and D, tracking error signals of the push-pull system are obtained. Since this signal is a signal corresponding to the relative position in the radial direction of the groove and the beam spot B, the wobbled signal of the groove is reproduced simultaneously. At a position in which an address pit is formed, a positive pulse or a negative pulse is detected depending on whether an address bit is on the inner rim side or on the outer rim side with respect to the groove. These positive or negative pulses are similarly included in the signal (A+B−C−D).

First, this signal (A+B−C−D) is passed through a low-pass filter (LPF) 17 to take out only the tracking error signal which is sent via a phase compensation circuit 18 to a tracking driving circuit 19 for outputting the tracking driving signal.

For detecting pulse signals generated by the address pits, there is employed a high-pass filter (HPF) 20 suppressing the signal less than 130 kHz for avoiding the effect of the noise of the low frequency range caused by, for example, meandering by wobbling.

Since the wobbled signal is a narrow-band signal, a wobbled signal of an optimum S/N ratio can be obtained by employing a band-pass filter (BPF) 21 capable of passing the narrow band. The resulting wobbled signal is converted to binary signals by a convert-to-binary circuit 22. The resulting bi-level data is compared by a frequency comparator circuit 23 to a reference frequency for producing a spindle motor control signal.

As described above, it is possible with the present embodiment to produce all signals required for signal reproduction using a sole four-segment PIN diode detector.

Second Embodiment

In the present embodiment, various combinations of the wobbled pits are explained.

In a first example, wobbling of a sole frequence and pits having a integer number relation with respect to the frequency of the wobbled signal is explained.

Figure 8:
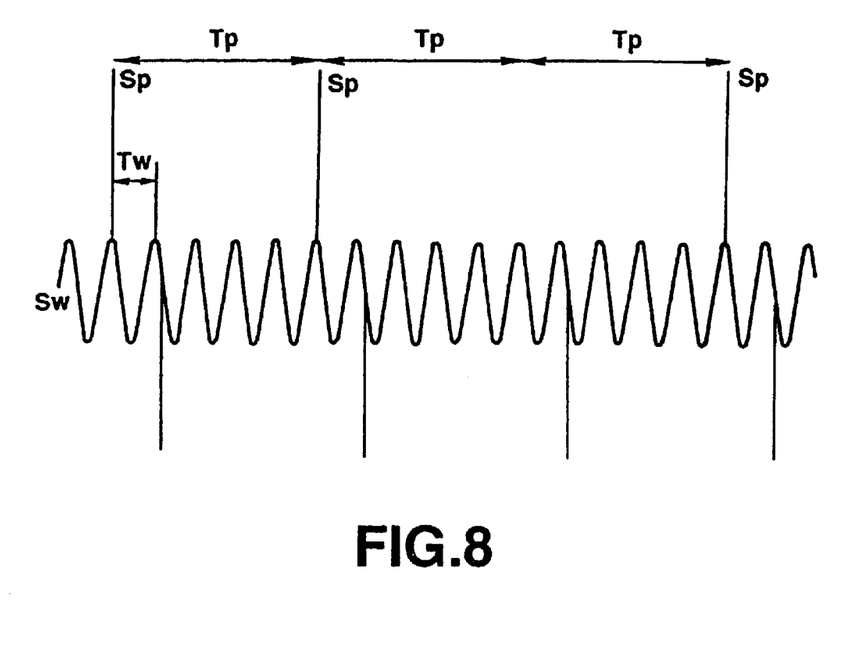
FIG. 8 is a waveform diagram showing an example of a playback signal in case the frequency of the wobbled signal and that of a pit signal are in a integer ration relationship to each other.

The signal obtained in this case is as shown in FIG. 8, from which it is seen that pit signals Sp are detected at an interval equal to an integer times the period Tw of the wobbled signal Sw, that is at an interval equal to an integer times the pit period Tp.

In a second example, pits are formed in phase with the modulated wobbled signal. In the present example, pits are formed at positions proximate to the neighboring groove, corresponding to the maximum wobbling. The pit signals Sp are positioned at apices of the wobbled signal Sw and pits are detected based only of the signal level of the pit signal Sp, as shown in FIG. 9.

Figure 9:
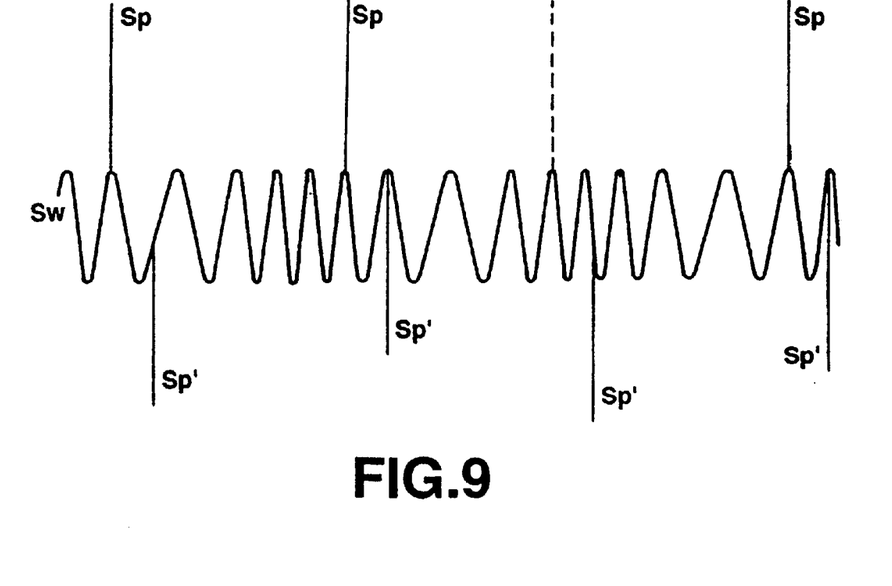
FIG. 9 is a waveform diagram showing an example of a playback signal in case the wobbled signal and pit signal are in phase with each other.

In FIG. 9, the pit signal Sp is generated by the pit formed on the inner rim side of the groove during tracking. On the other hand, the pit signal Sp$Æ$ is generated by the pit formed on the outer rim side of the groove.

In the first example, pit signals are detected after removing the wobbled signals from the pit signals by a high-pass filter. In the present example, the wobbled signal is passed through the high-pass filter and pits are detected by comparing the pit signal Sp inclusive of the wobbled signal with the detection level L. The reason is that, if the frequency band of the wobbled signal is close to that of the pit signals, it may be premeditated that difficulties are met in frequency separation by the high-pass filter.

In the present example, the pits on the inner rim side of the groove are recorded at positions corresponding to the maximum wobbling of the groove towards the inner rim. In this case, the outer rim side pit s formed at a maximum wobbling position towards the inner rim of an outer rim side neighboring groove.

The wobbled signal of a given turn of the groove and that of a neighboring turn are not necessarily coincident with each other. Therefore, if the pit signal Sp by the inner rim side pit is positioned at a position corresponding to the constant value of the wobbled signal, the pit signal Sp$Æ$ by the outer rim side pit, recorded in association with another turn of the groove, is positioned in a manner irrelevant of the wobbled signal.

Referring to FIG. 9, the peak values of the pit signals Sp$Æ$ by the outer rim side pit, formed at the positions irrelevant to the wobbled signal, are varied from pit to pit, while the peak values of the pit signals Sp by the inner rim side pits recorded at the constant wobbling positions, are constant.

If the peak values are constant, the peak values can be detected easily by a simple peak-hold circuit, despite variations in the pit signal amplitudes, such that, by exploiting the detected peak values, the pit detection level can be kept at an optimum level to enable stable pit detection. This is a merit proper to the case in which pits are formed at substantially the constant wobbling amount.

Moreover, since the pit signals Sp are positioned at apices of the wobbled signal Sw, the tolerable variation width of the detection level becomes maximum. This is a merit proper to the case in which pit positions correspond to the maximum wobbling and are proximate to the neighboring groove.

Figure 10:
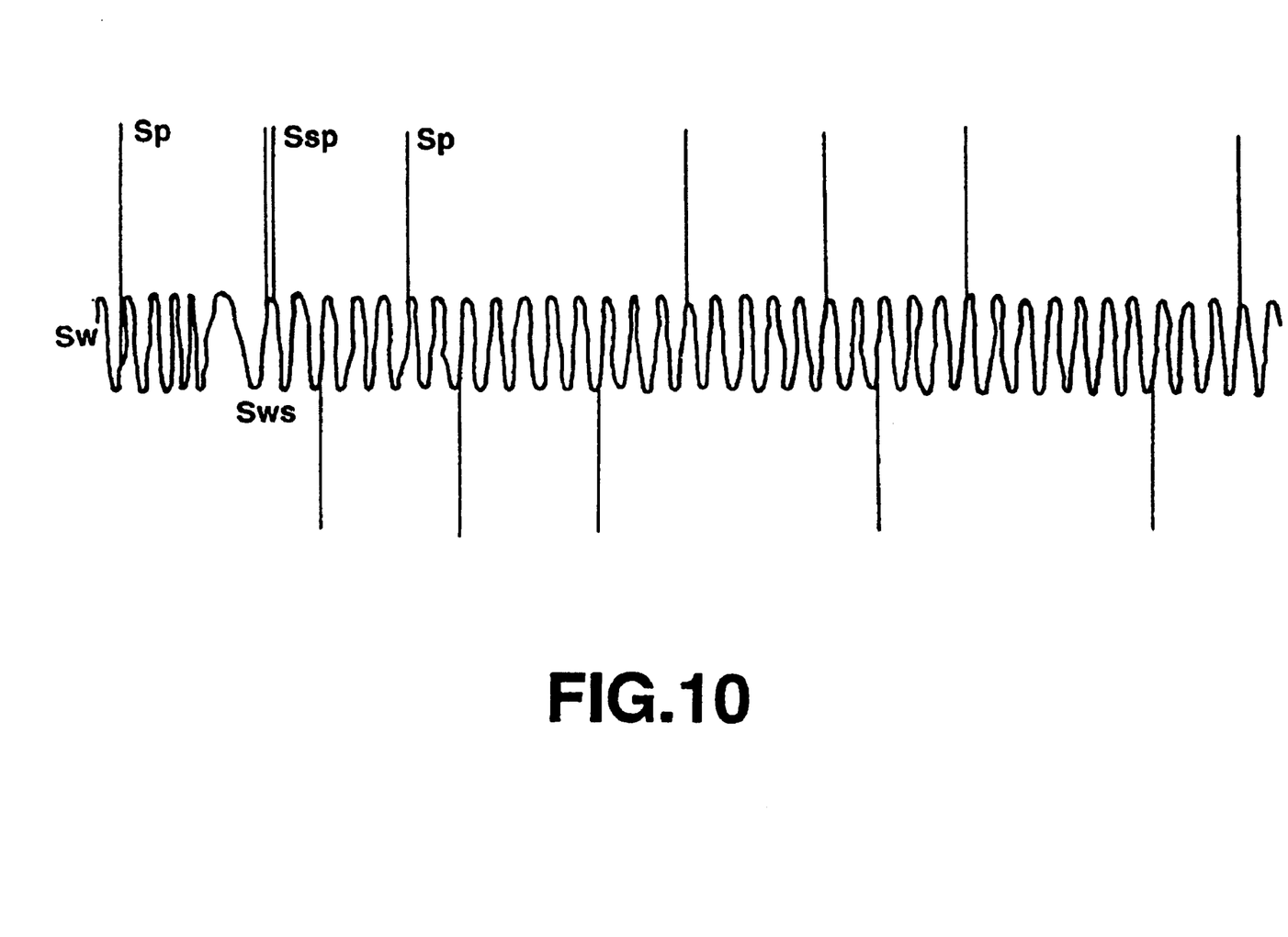
FIG. 10 is a waveform diagram showing an example of a playback signal in which synchronization signals are recorded in both the wobbled signal and the pit signal.

FIG. 10 shows an example in which synchronization signals Sws are recorded in the wobbled signal and combined with the sync pits Ssp.

In this case, the positions of the sync pits Ssp can be previously known from the synchronization signals Sws of the wobbled signal for assuring more reliable detection of the sync pits Ssp. The following merits are derived from the above-described various combinations of the wobbling and the pits First, the case in which wobbling is in phase with the pits is explained.

Figure 11:
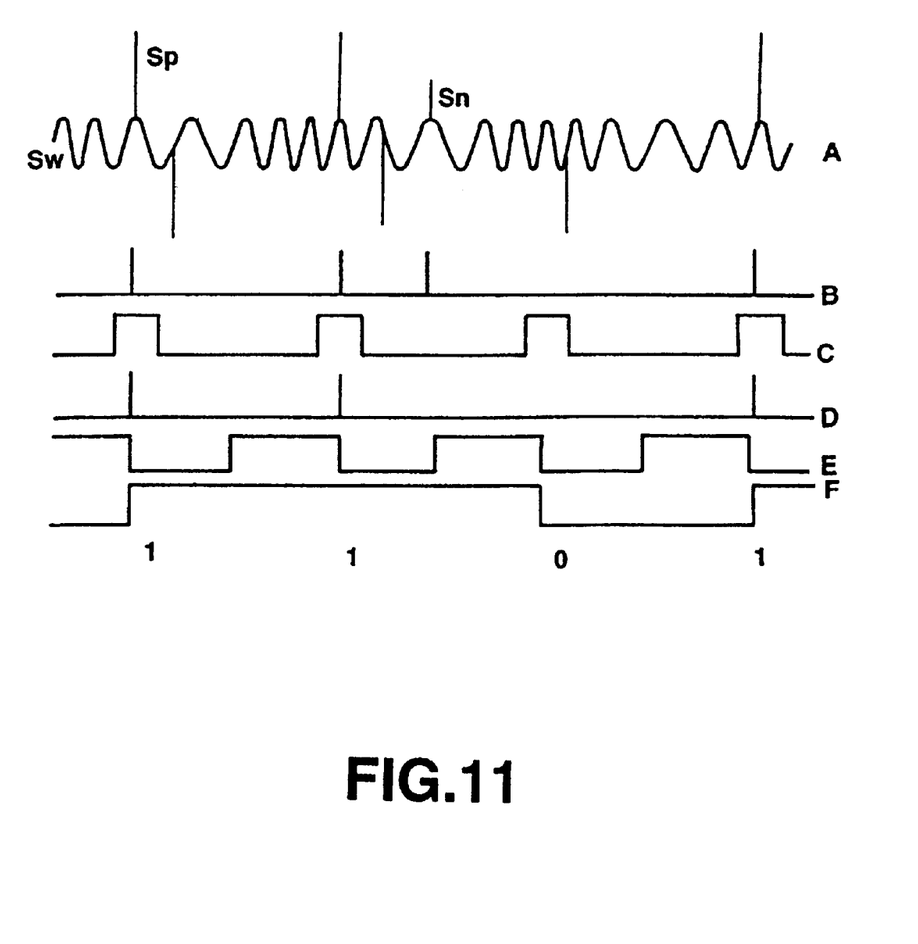
FIG. 11 is a timing chart in case the wobbled signal and the pit signal are in phase with each other.

FIG. 11 shows a playback signal obtained from such optical disc. The playback signal is made up of the wobbled signal Sw and the pit signals Sp corrupted by noise components Sn.

Figure 12:
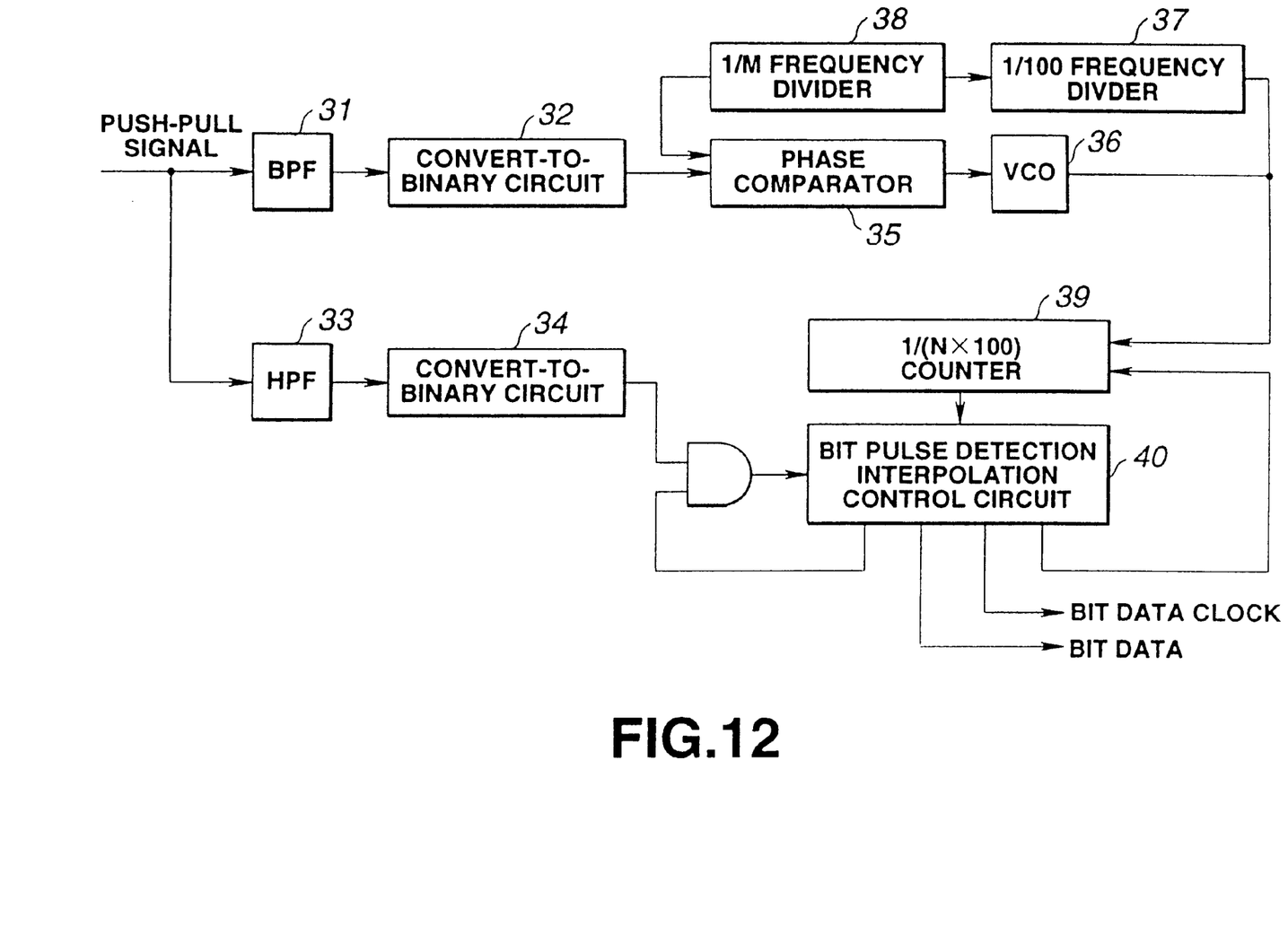
FIG. 12 is a block diagram showing an example of a playback circuit in a reproducing apparatus.

FIG. 12 shows, in a block diagram, a reproducing apparatus for reproducing the wobbled signal and the pit signals.

In the present reproducing apparatus, the wobbled signal Sw is fed via a band-pass filter 31 to a convert-to-binary circuit 32, while the pit signals Sp are fed via a by-pass filter 33 to a convert-to-binary circuit 34, for conversion to respective binary signals.

The convert-to-binary circuit 34 outputs the pit signals Sp and the noise components Sn, as shown in FIG. 11B.

The wobbled signal Sw is further sent to a phase comparator 35 for phase comparison to a signal obtained on 1/M*100 frequency division by a 1/100 frequency divider 37 and a 1/M frequency divider 38 of the oscillation frequency of the voltage controlled oscillator 36. By controlling the voltage controlled oscillator 36 by the phase information detected by the phase comparator 35, a phase-locked loop is formed, as a result of which a frequency Fo equal to (M*100) times the wobbled signal frequency Fw is outputted by the voltage controlled oscillator 36.

If the relation between the wobbling frequency Fw and the pit frequency Fp is given by Fw*M=Fp*N, the oscillation frequency Fo of the voltage controlled oscillator 36, given by Fo=Fw*(M*100)=Fp*(N*100), is equal to (N*100) times the pit frequency Fp.

Therefore, by frequency division of the output of the voltage controlled oscillator 36 by a 1/(N*100) counter 39, the phase information shown in FIG. 11C is obtained, and outputted to a pit pulse detection interpolation circuit 40.

By taking the AND of the phase information shown in FIG. 11C and the output of the convert-to-binary circuit 34, the noise components Sn are canceled, as shown in FIG. 11D, so that bit data clocks shown in FIG. 11E and the bit data as shown in FIG. 11F are outputted.

An example in which the synchronization (sync) signals are recorded in the wobbled signal and combined with the sync pits is now explained.

Figure 13:
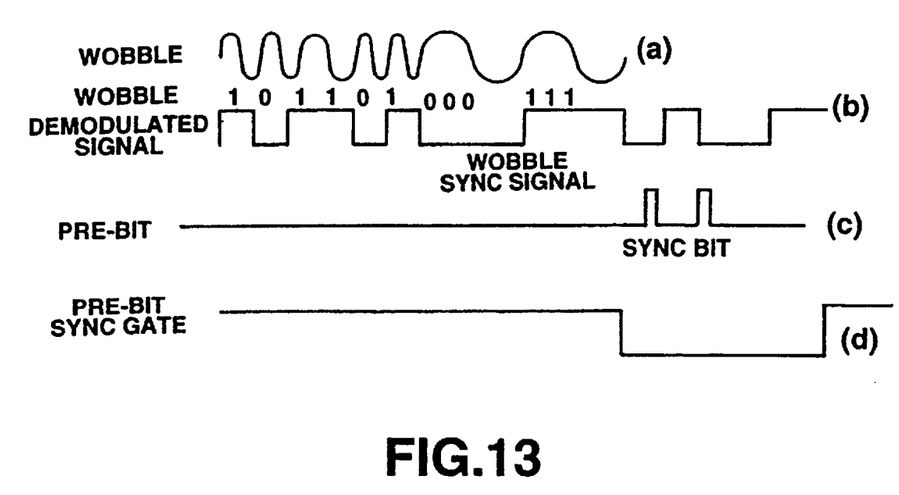
FIG. 13 is a timing chart in case synchronization signals are recorded in both the wobbled signal and the pit signal.

Referring to FIG. 13, a wobbled signal shown at (a) is frequency-modulated, and is demodulated to give a signal shown at (b). On the other hand, by arraying the sync of the pre-bit directly at back of the wobble sync, as shown at (c), the pre-bit sync can be detected after wobble sync detection.

The wobbling itself is not so accurate as the pre-pits. However, by providing an arrangement of pre-pit protection by a system different from one by the pre-pits, it becomes possible to improve safety of the pre-pit signal itself.

Figure 14:
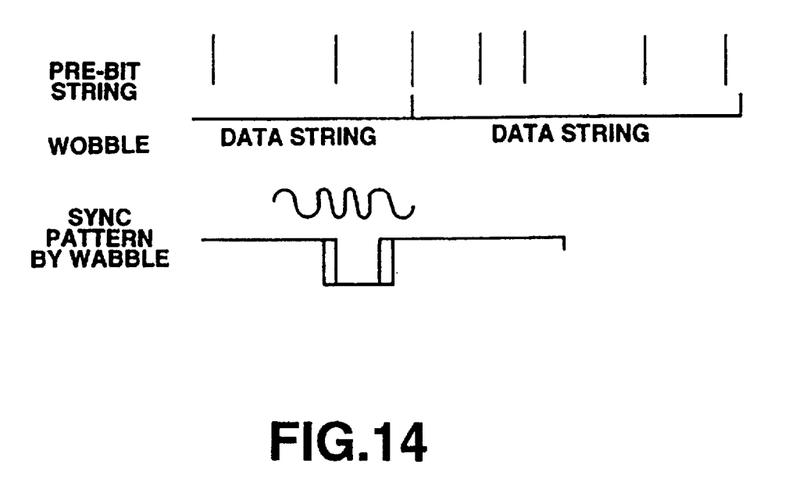
FIG. 14 is a timing chart in which a pre-pit string leading end judgment signal is inserted as a wobbled signal.
Figure 15:
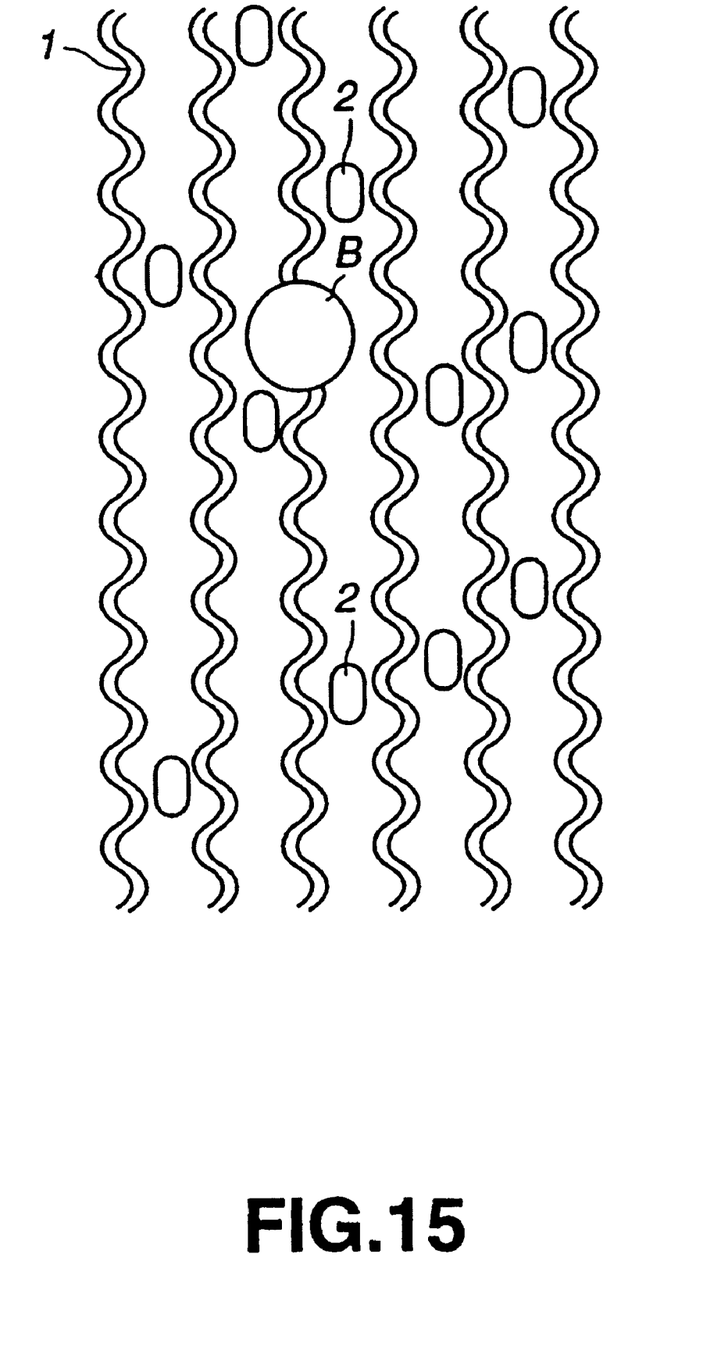
FIG. 15 is a schematic plan view showing a modification in the groove and the pit.

As a method of use other than gating, a leading end discrimination signal of a pre-pit string can be inserted by wobbling, as shown in FIG. 14.

The result is that there is no necessity of forming the sync pattern by pre-pits thus raising the pre-pit accuracy. Since there is no necessity of detecting the pre-pit sync pattern, circuit saving may be realized. In addition, the control circuit is duplicated, thus raising the reliability.

Although the foregoing description has been made of preferred embodiments of the present invention, it is to be noted that the present invention is not limited to these merely illustrative embodiments, but may comprise various modifications or combinations.

For example, address pits 2 may be designed as ordinary pits.

If the sector information is recorded on both the wobbled signal and the pits, these may be used independently of each other. For example, it is possible to exploit the address information by the pits before recording the signal and to exploit the address information recorded in the modulated state in the wobbled signal after recording the signal.

What is claimed is:

1. A recording and/or reproducing apparatus for recording and/or reproducing information on/from an optical recording medium having a wobbled groove formed in the optical recording medium, the wobbled groove having a sinusoidal shape, the sinusoidal shape defining a plurality of wobbling periods; a land region of the medium between neighboring turns of the wobbled groove; and a plurality of first pits formed in the land region adjacent to the groove, each first pit on one side of a turn of the wobbled groove being formed in a wobbling period at a substantially equivalent phase position with respect to the wobbled groove, only a single first pit being present in a wobbling period on said one side, the apparatus comprising:
    a detecting circuit that detects a wobbled signal from the groove and pit signals from the first pits; and
    a controller that controls rotation of the optical recording medium by the wobbled signal detected from the groove, and detects a position on the optical recording medium of a recording signal by the pit signals detected from the first pits.

2. The recording and/or reproducing apparatus as claimed in claim 1, wherein the detecting circuit has first and second detectors that detect the wobbled signal and the pit signals, a sole beam spot reflected from the medium being simultaneously incident on the first and second detectors, the wobbled signal and the pit signals being made by subtracting two signals from the first and second detectors.

3. The recording and/or reproducing apparatus as claimed in claim 1, wherein a clock signal for writing data signals onto the medium is obtained from the pit signals.

4. The recording and/or reproducing apparatus as claimed in claim 1, wherein the detecting circuit includes:
    a combining circuit that combines reflected light from the medium to form a combined signal;
    a band pass filter that detects the wobbled signal from the combined signal; and
    a high pass filter that detects the pit signals from the combined signal.

5. The recording and/or reproducing apparatus as claimed in claim 1, wherein the medium further comprises a plurality of second pits formed in the land adjacent to the groove in the wobbling periods, only two second pits being present in a wobbling period on said one side.

* * * * *